A. H. ROWAND.
Car Bumper.
No. 40,122. Patented Sept. 29, 1863.
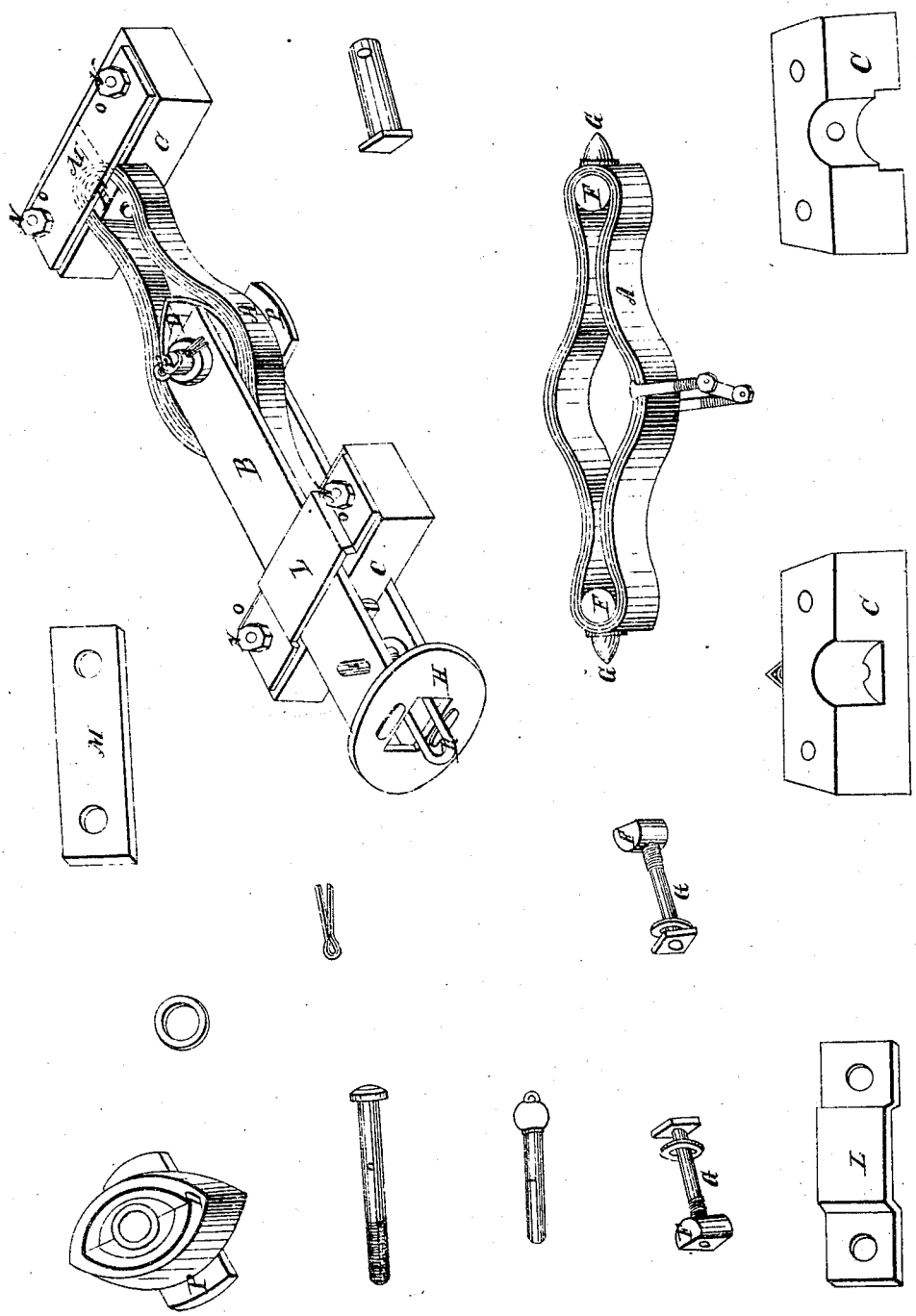

UNITED STATES PATENT OFFICE.

A. H. ROWAND, OF ALLEGHENY CITY, PENNSYLVANIA.

IMPROVEMENT IN BUFFER-SPRINGS FOR RAILROAD-CARS.

Specification forming part of Letters Patent No. 40,122, dated September 29, 1863.

*To all whom it may concern:*

Be it known that I, ARCHIBALD H. ROWAND, of the city and county of Allegheny, in the State of Pennsylvania, have invented certain new and useful Improvements in Buffer or Bumper Couplings for Railroad-Cars, of which the following is a full, clear, and exact description, reference being had to the accompanying drawings, which make part of this specification, and in which—

Figure 1 represents a view in perspective of my improved spring. Fig. 2 represents a similar view of the same when used as a bumper or buffer car-coupling, the portions of the car to which it is connected being shown as inverted and detached. Fig. 3 represents a similar view of the tongue, which acts upon the springs, detached; and Figs. 4 to 14, both inclusive, represent similar views of detached portions of the coupling and its appurtenances.

It is the object of my invention to prevent as much as possible injury to the passengers, freight, or rolling-stock of railroads from the concussions produced by the sudden stopping or starting of the cars, or their collision; and to this end the improvements claimed under this patent consist, first, in a bumper or buffer composed of a series of plate-metal springs provided with tapering and overlapping edges, and placed alternately at the ends of the spring, so as to form a spring continuous and complete in itself, and so formed with a swell or bulge in the middle, and a narrow neck, and a smaller swell at each end, that when compressed longitudinally the sides of the neck will be forced together, the curve of the spring shortened, and its power of resistance greatly increased, as hereinafter more fully shown; secondly, in combining with a continuous spring of plate-metal symmetrical at both ends, and having a swell in or near its middle, and a neck and smaller swell at each end, substantially in the manner hereinafter described, a double convex tongue or block upon the end of the coupling-bar, so that when force is applied to the coupling-bar the head is driven into one of the necks of the spring, and is thus compelled to force its way into an aperture of gradually-diminishing area, and has consequently to encounter a rapidly augmented resistance; thirdly, in combining the spring and tongue with flanges on the latter, by which means the tongue and spring are always maintained in the proper position relative to each other.

In the accompanying drawings, a bumper or buffer spring, A, embracing my improvements, is shown as having each end embedded in a stout beam, C, either or both of which beams may be firmly secured to the under side of the body of the car, as occasion may require. The ends of the springs are securely fastened to the cross-beams by means of bolts G and nuts F, the bolts passing through both the beam and springs. The spring is prevented from falling out of its bed by plates L M, secured by bolts O and nuts N.

A double-convex tongue, D, (shown in Figs. 1 and 3,) is secured within the central swell or hub of the spring in the following manner: A flange, P, on its upper side prevents it from working out of its proper position; a bifurcated draw-bar, B, embraces the spring and tongue, and is secured to the latter by a bolt, E. This bar slides endwise in grooves in the outer beam, C, or in the plate I, and terminates in a bumper-head, H, to which a coupling-link, K, is pivoted in the usual manner.

The operation of these devices will readily be understood by an inspection of the drawings. When either a pushing or pulling force is exerted upon the draw-bar B, the tongue D is forced into the narrow neck of the spring, and as it enters an aperture of gradually-diminishing area it encounters a rapidly-augmenting resistance.

Should the concussion be so violent as to force the bumper-head against the outer beam, C, and thus act upon the spring, its necks would be still further compressed, and even under very severe pressure or violent concussion be made to touch each other, in which event the ellipse of the spring would be shortened, and its power correspondingly augmented.

What I claim under this patent as my invention is—

1. A bumper or buffer composed of a series of overlapping plate-metal springs, so arranged as to form a continuous spring, and having a bulge or swell in the middle, a smaller bulge at each end, and a contraction or neck between the bulges, when constructed and operating substantially in the manner described, for the purposes set forth.

2. The combination of the spring A, double-convex tongue D, and draw-bar B, when arranged and operating substantially in the manner described, and for the purposes specified.

3. The combination of the spring A, double-convex tongue D, and flanges P, in the manner and for the purpose described.

In testimony whereof I have hereunto subscribed my name.

A. H. ROWAND.

Witnesses:
J. H. BALDWIN,
J. B. FLACK.